US010361454B2

United States Patent
Goodenough et al.

(10) Patent No.: US 10,361,454 B2
(45) Date of Patent: Jul. 23, 2019

(54) METAL PLATING-BASED ELECTRICAL ENERGY STORAGE CELL

(71) Applicant: Board of Regents, The University of Texas System, Austin, TX (US)

(72) Inventors: John B. Goodenough, Austin, TX (US); Andrew Murchison, San Jose, CA (US); Maria Helena Sousa Soares De Oliveira Braga, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 15/795,469

(22) Filed: Oct. 27, 2017

(65) Prior Publication Data

US 2018/0102569 A1    Apr. 12, 2018

Related U.S. Application Data

(63) Continuation of application No. 15/645,643, filed on Jul. 10, 2017.
(Continued)

(51) Int. Cl.
*H01M 10/0562* (2010.01)
*H01M 10/0561* (2010.01)
(Continued)

(52) U.S. Cl.
CPC ....... *H01M 10/0562* (2013.01); *H01M 4/661* (2013.01); *H01M 6/182* (2013.01);
(Continued)

(58) Field of Classification Search
None
See application file for complete search history.

(56) References Cited

U.S. PATENT DOCUMENTS 4,307,163 A    12/1981  Joshi et al.
5,279,910 A     1/1994  Sasaki et al.
(Continued)

FOREIGN PATENT DOCUMENTS

CA    2267319    4/1998
CA    2940598    9/2015
(Continued)

OTHER PUBLICATIONS

Hayashi, Akitoshi, et al. "Rechargeable lithium batteries, using sulfur-based cathode materials and Li2S—P2S5 glass-ceramic electrolytes." Electrochimica Acta 50.2-3 (2004): 893-897; 5 pages, 2004.
(Continued)

*Primary Examiner* — Basia A Ridley
*Assistant Examiner* — Heng M. Chan
(74) *Attorney, Agent, or Firm* — Baker Botts L.L.P.

(57) ABSTRACT

The present disclosure provides an electrochemical storage cell including a battery. The battery includes an alkali metal anode having an anode Fermi energy, an electronically insulating, amorphous, dried solid electrolyte able to conduct alkali metal, having the general formula $A_{3-x}H_xOX$, in which $0 \leq x \leq 1$, A is the alkali metal, and X is at least one halide, and a cathode including a cathode current collector having a cathode Fermi energy lower than the anode Fermi energy. During operation of the electrochemical storage cell, the alkali metal plates dendrite-free from the solid electrolyte onto the alkali metal anode. Also during operation of the electrochemical storage cell, the alkali metal further plates on the cathode current collector.

12 Claims, 5 Drawing Sheets

Related U.S. Application Data

(60) Provisional application No. 62/360,853, filed on Jul. 11, 2016.

(51) Int. Cl.
  *H01M 4/66* (2006.01)
  *H01M 6/18* (2006.01)
  *H01M 10/056* (2010.01)
  *H01M 4/02* (2006.01)

(52) U.S. Cl.
  CPC ......... *H01M 6/185* (2013.01); *H01M 10/056* (2013.01); *H01M 2004/028* (2013.01)

(56) References Cited

U.S. PATENT DOCUMENTS

| | | |
|---|---|---|
| 5,547,782 A | 8/1996 | Dasgupta et al. |
| 5,631,532 A | 5/1997 | Azuma et al. |
| 2004/0106046 A1 | 6/2004 | Inda |
| 2006/0263649 A1 | 11/2006 | Sohn |
| 2007/0003833 A1 | 1/2007 | Li et al. |
| 2007/0148553 A1 | 6/2007 | Weppner |
| 2012/0295147 A1 | 11/2012 | Liu et al. |
| 2013/0202971 A1 | 8/2013 | Zhao et al. |
| 2013/0344363 A1 | 12/2013 | Upadhyaya |
| 2014/0113187 A1 | 4/2014 | Winoto et al. |
| 2014/0141318 A1 | 5/2014 | Lee et al. |
| 2014/0272564 A1 | 9/2014 | Holme et al. |
| 2015/0303456 A1 | 10/2015 | Yoo et al. |
| 2015/0364788 A1 | 12/2015 | Lu et al. |
| 2016/0190640 A1 | 6/2016 | Visco et al. |
| 2016/0365602 A1 | 12/2016 | Sousa Soares De Oliveira Braga et al. |
| 2016/0368777 A1 | 12/2016 | Goodenough et al. |

FOREIGN PATENT DOCUMENTS

| | | |
|---|---|---|
| CN | 101811828 | 8/2010 |
| CN | 102249350 | 11/2011 |
| CN | 103268930 | 9/2015 |
| DE | 10200503851 | 2/2007 |
| EP | 3111503 | 1/2017 |
| KR | 20160142293 | 12/2016 |
| WO | 2012/112229 | 8/2012 |
| WO | 2013/077863 | 5/2013 |
| WO | 2016/026130 | 8/2014 |
| WO | 2015/128834 | 9/2015 |
| WO | 2016/205064 | 12/2016 |

OTHER PUBLICATIONS

International Preliminary Report on Patentability for PCT Patent Application No. PCT/US2016/036661, dated Dec. 28, 2017; 13 pages, dated Dec. 28, 2017.

ISO 11357-2: Plastics—Differential Scanning Calorimetry (DSC)—Part 2: Determination of glass transition temperature, 1999; 12 pages.

J.P. Hansen and I. R. McDonald, "Dynamics of Supercooled Liquids." Theory of Simple Liquids, Elsevier, 2006, 250-254; 10 pages.

Jayaprakash, N., Shen, J., Moganty, S. S., Corona, A., Archer, L. A. Porous Hollow Carbon@Sulfur Composites for High-Power Lithium-Sulfur Batteries. Angew. Chem. Int. Ed. 50, 5904 (2011); 5 pages.

Ji, L. et al. Graphene Oxide as a Sulfur Immobilizer in High Performance Lithium/Sulfur Cells, JACS, 133, 18522 (2011); 4 pages.

Jung, H. Y., Karimi, M. B., Hahm, M. G., Ajayan, P. M., Jung, Y. J., Transparent, flexible supercapacitors from nano-engineered carbon films. Sci. Rep. 2, 773 (2012); 5 pages.

Kamaya, Noriaki, et al. "A lithium superionic conductor." Nature materials 10.9 (2011): 682; 5 pages.

Koenig, A. A., Rasmussen, J. R. Development of a high specific power sodium sulfur cell. Proceedings of the 34th International Power Sources Symposium, p. 30. doi:10.1109/IPSS.1990.145783, 1990; 4 pages.

Kondo, S., K. Takada, and Y. Yamamura. "New lithium ion conductors based on Li2S—SiS2 system." Solid State Ionics 53 (1992): 1183-1186; 4 pages.

Kresse, Georg, and Jürgen Furthmüller. "Efficient iterative schemes for ab initio total-energy calculations using a plane-wave basis set." Physical review B 54.16 (1996): 11169; 18 pages.

Lapp, Torben, Steen Skaarup, and Alan Hooper. "Ionic conductivity of pure and doped Li3N." Solid State Ionics 11.2 (1983): 97-103; 7 pages.

Li, H. B. et al. Amorphous nickel hydroxide nanospheres with ultrahigh capacitance and energy density as electrochemical pseudocapacitor materials. Nature Commun. 4, 1894 (2013); 8 pages.

Liu, D., et al. "Spinel materials for high-voltage cathodes in Li-ion batteries." Rsc Advances 4.1 (2014): 154-167; 14 pages.

Liu, Duay, J., Lane, T., Lee, S. B. Synthesis and characterization of RuO2/poly(3,4-ethylenedioxythiophene) composite nanotubes for supercapacitors. Phys. Chem. Chem. Phys. 12, 4309 (2010); 8 pages.

Liu, Zengcai, et al. "Anomalous high ionic conductivity of nanoporous β-Li3PS4." Journal of the American Chemical Society 135.3 (2013): 975-978; 4 pages.

Lu, S., Chen, Y., Wu, X., Wang, Z., Yang Li, Y. Three-Dimensional Sulfur/Graphene Multifunctional Hybrid Sponges for Lithium-Sulfur Batteries with Large Areal Mass Loading. Sci. Rep. 4, 4629 (2014); 4 pages.

Ma, G., A lithium anode protection guided highly-stable lithium-sulfur battery. Chem. Commun. 50, 14209 (2014); 4 pages.

Manthiram, Arumugam, et al. "Rechargeable lithium-sulfur batteries." Chemical reviews 114.23 (2014): 11751-11787; 37 pages.

Mo, Yifei, Shyue Ping Ong, and Gerbrand Ceder. "First principles study of the Li10GeP2S12 lithium superionic conductor material." Chemistry of Materials 24.1 (2012): 15-17; 3 pages.

Nagao, M., Hayashi, A., Tatsumisago, M. Fabrication of favorable interface between sulfide solid electrolyte and Li metal electrode for bulk-type solid-state Li/S battery, Electrochem. Commun. 22, 177 (2012); 4 pages.

Ong, S. P., Chevrier, V. L, Hautier, G., Jain, A., Moore, C, Kim, S., Ma, X. H., Ceder, G., "Voltage, Stability and Diffusion Barrier Differences Between Sodium-ion and Lithium-ion Intercalation Materials". Energy Environ. Sci., 4, 3680 (2011); 9 pages.

Palomares, Verónica, et al. "Na-ion batteries, recent advances and present challenges to become low cost energy storage systems." Energy & Environmental Science 5.3 (2012): 5884-5901; 18 pages.

Parlinski, K., Z. Q. Li, and Y. Kawazoe. "First-principles determination of the soft mode in cubic ZrO 2." Physical Review Letters 78.21 (1997): 4063; 4 pages.

PCT Patent Application No. PCT/US2017/041348 filed Jul. 10, 2017 by John B. Goodenough, et al; 22 pages.

Perdew, John P., and Yue Wang. "Accurate and simple analytic representation of the electron-gas correlation energy." Physical Review B 45.23 (1992): 13244; 6 pages.

Sakka, S., and J. D. Mackenzie. "Relation between apparent glass transition temperature and liquids temperature for inorganic glasses." Journal of Non-Crystalline Solids 6.2 (1971): 145-162; 12 pages.

Schwering, Georg, et al. "High Lithium Ionic Conductivity in the Lithium Halide Hydrates Li3-n (OHn) Cl(0.83≤n≤2) and Li3-n (OHn) Br (1≤n≤2) at Ambient Temperatures." ChemPhysChem 4.4 (2003): 343-348; 6 pages.

Shannon, Robert D. "Revised effective ionic radii and systematic studies of interatomic distances in halides and chalcogenides." Acta crystallographica section A: crystal physics, diffraction, theoretical and general crystallography 32.5 (1976): 751-767; 17 pages.

Song, H. K., Lee, K. T., Kim, M. G., Nazar, L. F., Cho, J., Recent progress in nanostructured cathode materials for lithium secondary batteries. Adv. Fund. Mater. 20, 3818 (2010); 17 pages.

Song, J. Y., Y. Y. Wang, and C. C. Wan. "Conductivity study of porous plasticized polymer electrolytes based on poly (vinylidene fluoride) a comparison with polypropylene separators." Journal of the Electrochemical Society 147.9 (2000): 3219-3225; 7 pages.

(56) References Cited

OTHER PUBLICATIONS

Song, W., Cao, X., Wu, Z., Chen, J., Huangfu, K., Wang, X., Huang, Y., Ji, X. A study into the extracted ion number for NASICON structured $Na_3V_2(PO_4)_3$ in sodium-ion batteries Phys. Chem. Chem. Phys. 16, 17681 (2014); 7 pages.

Stahlkopf, Karl (Jun. 2006). Taking Wind Mainstream. IEEE Spectrum, retrieved Mar. 21, 2015; 4 pages.

Stevens, D. A., Dahn J. R. High capacity anode materials for rechargeable sodium-ion batteries. J. Electrochem. Soc. 147, 1271 (2000); 3 pages.

Takada, Kazunori, Noboru Aotani, and Shigeo Kondo. "Electrochemical behaviors of Li+ ion conductor, Li 3 PO 4-Li 2 S—SiS 2." Journal of power sources 43.1 (1993): 135-141; 7 pages.

Tarascon, J.-M., Armand, M., Issues and challenges facing rechargeable lithium batteries. Nature 414, 359 (2001); 9 pages.

Tatsumisago, Masahiro, and Akitoshi Hayashi. "Superionic glasses and glass-ceramics in the Li 2 S—P 2 S 5 system for all-solid-state lithium secondary batteries." Solid State Ionics 225 (2012): 342-345; 4 pages.

U.S. Appl. No. 15/700,414, filed Sep. 11, 2017 by Maria Helena Sousa Soares de Oliveira Braga, et al.

U.S. Appl. No. 15/645,643, filed Jul. 10, 2017 by John B. Goodenough, et al.

Vlad, A. et al. Hybrid supercapacitor-battery materials for fast electrochemical charge storage. Sci. Rep. 4, 4315 (2014); 7 pages.

Walawalkar, R., Apt, J., Mancini, R. (2007). Economics of electric energy storage for energy arbitrage and regulation in New York. Energy Policy 35(4), 2558 (2007); 11 pages.

Wang, Yonggang, et al. "Structural manipulation approaches towards enhanced sodium ionic conductivity in Na-rich antiperovskites." Journal of Power Sources 293, Jun. 10, 2015 (Jun. 10, 2015), pp. 735-740, XP055279752, CH ISSN: 0378-7753, DOI: 10.1016/j.jpowsour.2015.06.002 abstract; 6 pages.

Wimmer, Erich, et al. "Temperature-dependent diffusion coefficients from ab initio computations: Hydrogen, deuterium, and tritium in nickel." Physical Review B 77.13 (2008): 134305; 12 pages.

Xie, J. et al. Preparation of three-dimensional hybrid nanostructure-encapsulated sulfur cathode for high-rate lithium sulfur batteries. J. Power Sources, 253, 55 (2014); 9 pages.

Yabuuchi, N ., Kubota, K., Dahbi, M., Komaba, S., Research Development on Sodium-Ion Batteries. Chem. Rev. 114, 11636 (2014); 47 pages.

Yao, H. et al. Improved lithium-sulfur batteries with a conductive coating on the separator to prevent the accumulation of inactive S-related species at the cathode-separator interface. Energy Environ. Sci. 7, 3381 (2014); 10 pages.

Zhang, S. et al. Control of graphitization degree and defects of carbon blacks through ball-milling. RSC Adv. 4, 505 (2014); 5 pages.

Zhang, S. S. Liquid electrolyte lithium/sulfur battery: Fundamental chemistry, problems, and solutions. Power Sources, 231, 153 (2013); 10 pages.

Zhang, Yi, Yusheng Zhao, and Changfeng Chen. "Ab initio study of the stabilities of and mechanism of superionic transport in lithium-rich antiperovskites." Physical Review B 87.13 (2013): 134303; 8 pages.

Zhao, Yusheng, and Luke L. Daemen. "Superionic conductivity in lithium-rich anti-perovskites." Journal of the American Chemical Society 134.36 (2012): 15042-15047; 6 pages.

Zheng, S. et al. J. High Performance C/S Composite Cathodes with Conventional Carbonate-Based Electrolytes in Li—S Battery. Sci. Rep. 4, 4842 (2014); 7 pages.

Zhang, Jianzhong, et al. "High pressure-high temperature synthesis of lithium-rich Li 3 O (Cl, Br) and Li 3—x Ca x/2 OCl antiperovskite halides." Inorganic Chemistry Communications 48 (2014): 140-143.

"NRL's Sodium Sulfur Battery Experiment Flies Aboard STS-87." NRL's Sodium Sulfur Battery Experiment Flies Aboard STS-87—U.S. Naval Research Laboratory, www.nrl.navy.mil/media/news-releases/1997/nrls-sodium-sulfur-battery-experiment-flies-aboard-sts87; 1 page, 1997.

Alcantara, R., Lavela, P., Ortiz, G. F., Tirado, J. L, Carbon Microspheres Obtained from Resorcinol-Formaldehyde as High-Capacity Electrodes for Sodium-Ion Batteries. Electrochem. Solid-Stote Lett, 8, A222 (2005); 4 pages.

Angell, C. Austin, et al. "Relaxation in glassforming liquids and amorphous solids." Journal of Applied Physics 88.6 (2000): 3113-3157; 45 pages.

Angell, C. Austin. "Dynamic processes in ionic glasses." Chemical Reviews 90.3 (1990): 523-542; 20 pages.

Auxer, W. The PB sodium sulfur cell for satellite battery applications. Proceedings of the International Power Sources Symposium, 32nd, Cherry Hill, NJ (Pennington, NJ: Electrochemical Society). A88-16601 04-44: 49-54. (1986); 7 pages.

BeauHD, "The Slashdot Interview with Lithium-Ion Battery Inventor John B. Goodenough." Posted Apr. 19, 2017, retrieved from <https://hardware.slashdot.org/story/17/04/19/016213/the-slashdot-interview-with-lithium-ion-battery-inventor-john-b-goodenough>; 36 pages.

Blöchl, Peter E. "Projector augmented-wave method." Physical review B 50.24 (1994): 17953; 27 pages.

Braga, M. H., et al. "Alternative strategy for a safe rechargeable battery." Energy & Environmental Science 10.1 (2017): 331-336; 6 pages.

Braga, M. Helena, et al. "The Role of Defects in Li 3 ClO Solid Electrolyte: Calculations and Experiments." MRS Online Proceedings Library Archive 1526 (2013); 5 pages.

Braga, M. H., et al. "Novel Li 3 ClO based glasses with superionic properties for lithium batteries." Journal of Materials Chemistry A 2.15 (Jan. 26, 2014): 5470-5480; 11 pages.

Braga, M. Helena, et al. "Electric Dipoles and Ionic Conductivity in a Na+ Glass Electrolyte." Journal of the Electrochemical Society 164.2 (2017): A207-A213; 7 pages.

Braga, M. Helena, et al. "Glass-amorphous alkali-ion solid electrolytes and their performance in symmetrical cells." Energy & Environmental Science 9.3 (2016): 948-954; 7 pages.

Bruce, P. G., "Electrochemical Publishing" Solid State Electrochemistry, Cambridge University Press, 1994; 1 page.

Chen, Zonghai, et al. "Multi-scale study of thermal stability of lithiated graphite." Energy & Environmental Science 4.10 (2011): 4023-4030; 8 pages.

Choi, Nam-Soon, et al. "Challenges facing lithium batteries and electrical double-layer capacitors." Angewandte Chemie International Edition 51.40 (2012): 9994-10024; 31 pages, 2012.

Christensen, M., et al. "H in α-Zr and in zirconium hydrides: solubility, effect on dimensional changes, and the role of defects." Journal of Physics: Condensed Matter 27.2 (2014): 025402; 13 pages.

Conway, B.E., Transition from "supercapacitor" to "battery" behavior in electrochemical energy storage. J. Electrochem. Soc. 138, 1539 (1991); 10 pages.

Daemen L.L., "Novel anti-perovskite electrolytes for superionic lithium transport" [online], FU11 Annual Progress Report—laboratory directed research and development, Los Alamos National Library, Mar. 2012; 4 pages.

Doeff, Marca M., et al. "Electrochemical insertion of sodium into carbon." Journal of The Electrochemical Society 140.12 (1993): L169-L170; 2 pages.

Ellis, B. L., Nazar, L. F., Sodium and sodium-ion energy storage batteries. Curr. Opin. Solid State Mater. Sci. 16, 168 (2012); 10 pages.

Ghidiu, Michael, et al. "Conductive two-dimensional titanium carbide'clay'with high volumetric capacitance." Nature 516.7529 (2014): 78; 13 pages.

Goodenough, John B. "Changing Outlook for Rechargeable Batteries." (2017): 1132-1135; 4 pages.

Goodenough, John B. et al. "Review-Solid Electrolytes in Rechargable Electrochemical Cells." Journal of The Electrochemical Society (2015); 6 pages.

(56) References Cited

OTHER PUBLICATIONS

Goodenough, John B. et al. "Solid Electrolytes in Rechargable Electrochemical Cells." Journal of The Electrochemical Society (Oct. 15, 2015); 22 pages.

Goodenough, John B., and Kyu-Sung Park. "The Li-ion rechargeable battery: a perspective." Journal of the American Chemical Society 135.4 (2013): 1167-1176; 10 pages.

H. Mehrer, Diffusion in Solids Fundamentals, Methods, Materials, Diffusion-Controlled Processes, Springer Series in Solid-State Sciences, 1st edn, vol. 155, 2007; 645 pages.

Hartwig, P., A. Rabenau, and W. Weppner. "Lithium hydroxide halides: phase equilibria and ionic conductivities." Journal of the Less Common Metals 78.2 (1981): 227-233; 7 pages.

Hartwig, P., and W. Weppner. "Ionic conductivities of lithium-halide-based quaternary compounds." Solid State Ionics 3 (1981): 249-254; 6 pages.

Hayashi, Akitoshi, et al. "Characterization of $Li_2S$—$SiS_2$—$Li_xMO_y$ (M=Si, P, Ge) amorphous solid electrolytes prepared by melt-quenching and mechanical milling." Solid State Ionics 148.3 (2002): 381-389; 9 pages.

Hebb, Malcolm H. "Electrical conductivity of silver sulfide." The journal of chemical physics 20.1 (1952): 185-190; 6 pages.

Heimann, B., Classic and Advanced Ceramics: From Fundamentals to Applications. John Wiley & Sons, Apr. 16, 2010; 576 pages.

Heyd, Jochen, Gustavo E. Scuseria, and Matthias Ernzerhof. "Hybrid functionals based on a screened Coulomb potential." The Journal of Chemical Physics 118.18 (2003): 8207-8215; 9 pages.

Hong, S. Y., Kim, Y., Park, Y., Choi, A. Choic, N.-S., Lee, K. T., Charge carriers in rechargeable batteries: Na ions vs. Li ions, Energy Environ. Sci. 6, 2067 (2013); 15 pages.

Hönnerscheid, Andreas, et al. "Die Kristallstrukturen der Hydroxyhalogenide $Li_4(OH)_3Br$ und $Li_4(OH)_3I$." Zeitschrift für anorganische und allgemeine Chemie 629.2 (2003): 317-320; 4 pages.

Hsu, Jeremy. "Texas Town Installs a Monster Battery for Backup Power." Popular Science, Apr. 5, 2010, www.popsci.com/technology/article/2010-04/texas-town-turns-monster-battery-backup-power.

Inaguma, Yoshiyuki, et al. "High ionic conductivity in lithium lanthanum titanate." Solid State Communications 86.10 (1993): 689-693; 5 pages.

Ohara Inc., ">1)LICGC™ AG-01." Ohara Inc. : Lithium-Ion Conducting Glass-Ceramics (LICGC) :Development Products, www.ohara-inc.co.jp/en/product/electronics/licgc.html; 2 pages, 2017.

International Preliminary Report on Patentability for PCT Patent Application No. PCT/IB2016/051451, dated Sep. 21, 2017; 7 pages.

International Preliminary Report on Patentability for PCT Patent Application No. PCT/IB2016/051776, dated Oct. 3, 2017; 8 pages.

International Search Report and Written Opinion received for PCT Patent Application No. PCT/US2016/036661, dated Nov. 30, 2016; 20 pages.

International Search Report and Written Opinion received for PCT Patent Application No. PCT/US2017/041348, dated Aug. 17, 2017; 15 pages.

International Search Report and Written Opinion received for PCT Patent Application No. PCT/US2017/041382, dated Aug. 25, 2017; 12 pages.

Braga, Maria Helena, et al. "Nontraditional, Safe, High Voltage Rechargeable Cells of Long Cycle Life." Journal of the American Chemical Society 140.20 (2018): 6343-6352; 20 pages.

Goodenough, John B., and M. Helena Braga. "Batteries for electric road vehicles." Dalton Transactions 47.3 (2017): 645-648; 4 pages.

Jennings, James Robert, Qizhao Huang, and Qing Wang. "Kinetics of $Li_xFePO_4$ Lithiation/Delithiation by Ferrocene-Based Redox Mediators: An Electrochemical Approach." *The Journal of Physical Chemistry C* 119.31 (2015): 17522-17528: 7 pages.

Cunningham, Tesla Model S: The battery pack, Road Show by CNET, Oct. 6, 2010; 4 pages.

Emly et al. "Phase stability and transport mechanisms in antiperovskite $Li_3OCl$ and $Li_3OBr$ superionic conductors." Chemistry of Materials 25.23 (2013): 4463-4670; 8 pages.

International Preliminary Report on Patentability for PCT Patent Application No. PCT/IB2017/041348, dated Jan. 24, 2019; 10 pages.

International Preliminary Report on Patentability for PCT Patent Application No. PCT/US2017/041382, dated Jan. 24, 2019; 8 pages.

International Search Report and Written Opinion received for PCT Patent Application No. PCT/US2018/055342, dated Jan. 18, 2019; 14 pages.

Schroeder et al. "Stability of the solid electrolyte $Li_3OBr$ to common battery solvents." Materials Research Bulletin 29 (2014): 614-617; 4 pages.

METAL PLATING-BASED ELECTRICAL ENERGY STORAGE CELL

RELATED APPLICATIONS

This application claims priority to U.S. Provisional Application Ser. No. 62/360,853 filed Jul. 11, 2016, and which is incorporated herein by reference in its entirety.

TECHNICAL FIELD

The present disclosure relates to electrochemical storage cells, and in particular, to a metal plating-based electrochemical energy storage cell, which may include a battery, such as a rechargeable-battery, or a combined battery/supercapacitor.

BACKGROUND

Batteries

A battery, as used herein, refers to a cell having two electrodes, an anode and a cathode, separated by an electrolyte. The cell may be an electrochemical cell. Materials in the electrodes may be both electronically and chemically active. The anode may be a chemical reductant and the cathode may be a chemical oxidant. Thus, both the anode and the cathode may be able to gain and lose ions, typically the same ion, which is referred to as a 'working ion' of the battery. The electrolyte may be chemically active while being electronically passive. The chemical activity of the electrolyte is exhibited by the ability to gain and lose ions, which are typically the working ion. The electrolyte is generally an electronic insulator, and may not promote the movement of electrons within the battery.

The battery may operate via a chemical reaction between the two electrodes that has an electronic and an ionic component, and is hence called an 'electrochemical reaction'. The electrolyte conducts the working ion inside the cell and, as an electronic insulator, enables electrons involved in the reaction to pass through an external circuit.

When a liquid or polymer electrolyte is used in a battery, a separator that remains an electronic insulator on contact with the two electrodes may be used to keep the two electrodes from electronically contacting each other inside the cell. The separator may be permeated by the liquid or polymer electrolyte to allow ionic conduction between the two electrodes. In some battery implementations, a solid electrolyte may be used as the separator. Solid electrolytes may be used alone or with a liquid or polymer electrolyte contacting one or both electrodes. Solid electrolytes may also function as a separator, such that a separate separator is not needed.

Batteries are often named after the working ion. For instance, lithium ion (Li+) is the working ion in a lithium-ion (Li-ion) battery. Sodium ion (Na+) is the working ion in a sodium-ion (Na-ion) battery. Li-ion batteries are commonly used in electronic devices, power tools, and electric vehicles. A Li-ion battery is assembled in a discharged state to enable preparation of a high-voltage cathode and an anode free of metallic lithium, while a flammable organic-liquid electrolyte may be used. Incremental improvements in Li-ion batteries have been obtained by the fabrication of complex electrode morphologies, but the carbon anode has limited capacity and may be plated by metallic lithium under an excessively high rate of charge. In addition, oxygen may be lost from a layered-oxide cathode if the cell is overcharged. Managing a large stack of cells over many charge and discharge cycles may increase the cost of a large, multi-cell battery, such as those used in electric vehicles. Moreover, the ability to increase the volumetric capacity of batteries, which is applicable for portable batteries, among other applications, has been limited. Finally, organic-liquid electrolytes suitable for most Li-ion batteries are flammable, posing safety risks, particularly if the batteries form dendrites or are damaged in some way that allows electronic contact between the cathode and the anode within the battery.

Supercapacitors

Supercapacitors utilize the capacitances of an electronic double layer at an electrode-electrolyte interface where positive and negative charges are separated by only atomic dimensions. Moreover, if the electrolyte has a large dielectric constant as a result of the presence of electric dipoles, the capacitance can be increased even further. The supercapacitor stores electric power as static electric charge rather than as chemical energy even where the supercapacitor may contain a faradaic component of electrical-energy storage.

BRIEF DESCRIPTION OF THE DRAWINGS

A more complete understanding of the present embodiments and advantages thereof may be acquired by referring to the following description taken in conjunction with the accompanying drawings, which relate to embodiments of the present disclosure.

DETAILED DESCRIPTION

Figure 1:
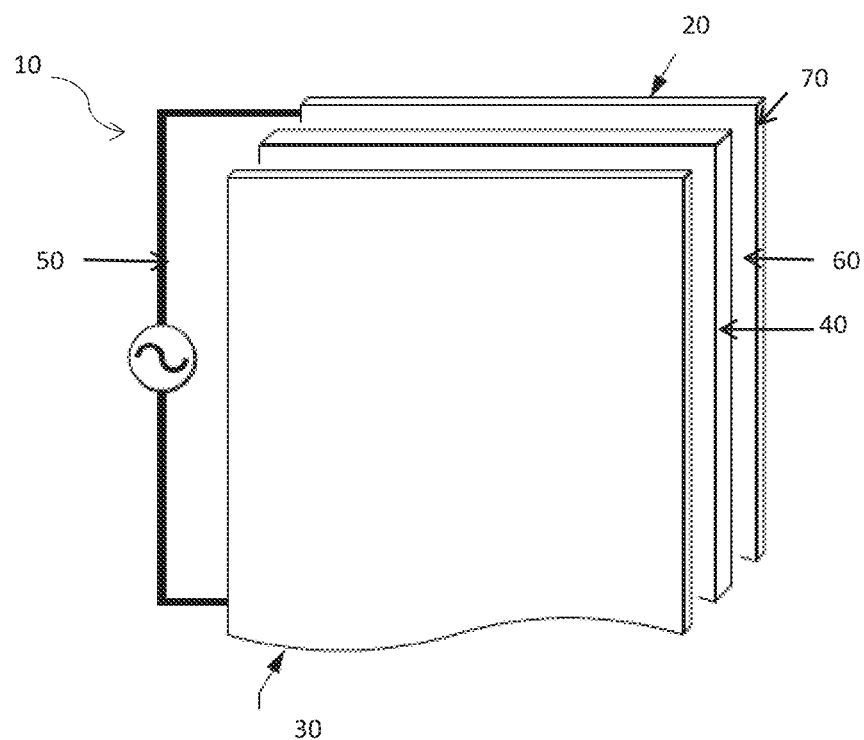
FIG. 1 is a schematic diagram of a catalytic redox-center-relay battery.

The disclosure relates to metal plating-based electrical energy storage cells. The cells may include batteries, particularly rechargeable batteries, and various combinations of batteries and supercapacitors. More specifically, the present disclosure describes all-solid-state rechargeable cells in which the cation of a metal plated on the anode current collector during charge is supplied by the electrolyte. Batteries according to the present disclosure may have a high energy storage capacity with high charge rates, and long operational lifetimes over many cycles. Supercapacitors according to the present disclosure may have an optimized or increased volumetric stored energy density.

Batteries and supercapacitors according to the present disclosure may contain a solid electrolyte that contains electric dipoles that are oriented parallel to one another and if the electrodes or current collectors have a large energy difference in electrochemical potential, a battery cell that incorporates a series connection of the faradaic and capacitive electrical energy storage may exhibit an enhanced energy density. Unlike the traditional Li-ion battery, which has a carbon electrode and a layered oxide cathode and is limited in the rate and extent of charge and discharge, the present disclosure provides a safe, all-solid-state battery or supercapacitor cell that may provide a large volumetric energy density, a fast rate of charge and discharge, and a long cycle life.

The present disclosure describes all-solid-state rechargeable cells in which the cation of a metal plated on the anode current collector during charge is supplied by the electrolyte.

In a secondary (rechargeable) cell, an alkali metal on the cathode current collector is plated back on the anode without the formation of anode dendrites. The anode dendrites may be prevented if the alkali metal wets the solid-electrolyte surface, and the anode is free of a passivating solid-electrolyte interphase (SEI) layer, such that the solid electrolyte has a lowest unoccupied molecular orbital (LUMO) at an energy above $\mu A$, which is the Fermi energy of the anode. As disclosed herein, such a solid electrolyte may enable the cell to be safe and the efficiency of electrical energy storage in the cell can approach 100% with a long cycle life.

The storage of electrical energy as chemical energy in the battery cells disclosed herein may be supplemented by the storage of electrical energy as electrostatic energy, as in a supercapacitor. The electrostatic energy may be provided by the formation of an electric double layer at the electrode-electrolyte interface. Moreover, an amount of electrostatic energy stored may further be increased if the electrolyte contains electric dipoles, particularly where the electric dipoles are oriented parallel to one another. The rates of charge and discharge of the electrostatic energy stored in the cells disclosed herein may be relatively high with high efficiency.

In an electrochemical cell, such as a battery cell, of the present disclosure, a metal may be plated from the solid electrolyte. The metal plated may be the metal form of the working ion. For example, the metal may be an alkali metal, such as lithium (Li), sodium (Na), or potassium (K), or magnesium (Mg) or aluminum (Al). The metal is plated beneficially on a cathode current collector, such as a copper (Cu), silver (Ag), zinc (Zn), or gold (Au) metal, or an alloy thereof cathode current collector. The plating may occur without the formation of dendrites or other metal structures harmful to energy storage cell performance.

FIG. 1 is a schematic diagram of a catalytic redox-center-relay battery 10, which includes a cathode 20, an anode 30 and an electrolyte 40. Battery 10 may be connected to an external circuit 50, which may include a load that uses stored energy upon discharge, or a power supply that provides energy to be stored upon charge, if battery 10 is rechargeable.

Anode 30 may include a current collector, which may include the working ion. The current collector may simply be the metal of the working ion. In some instances, the current collector may be an alloy of the metal of the working ion and another metal. Anode 30 may be substantially the same as the current collector. In some embodiments, anode 30 may include other or different materials than the current collector.

Electrolyte 40 may be a solid electrolyte, which may be used alone or in combination with a liquid or polymer electrolyte. Thus, electrolyte 40 may have the same or different composition at cathode 20 versus at anode 30. The solid electrolyte may have an ionic conductivity comparable to that of an organic-liquid electrolyte and a large dielectric constant associated with electric dipoles in the solid electrolyte that can be oriented parallel to one another.

In particular, the solid electrolyte may be a glass or an amorphous solid that may be water-solvated and may conduct monovalent cations such as Li+, Na+, or H+, or mixtures thereof. The solid electrolyte may be an electronic insulator. When the solid electrolyte conducts Li+, Na+, or mixtures thereof, the solid electrolyte may be dried. When the solid electrolyte conducts H+, the solid electrolyte may not be dried. Such an electrolyte is described in detail in PCT/US2016/036661, which is incorporated by reference herein in its entirety.

The dried, water-solvated glass/amorphous solid that conducts Li+, Na+, or mixtures thereof, may be formed by transforming a crystalline sodium-ion (Na+) or a crystalline lithium-ion (Li+) electronic insulator (or its constituent precursors comprising at least one Na+ or Li+ bonded to oxygen (O), hydroxide (OH), or to at least one halide into a water-solvated glass/amorphous Na+ or Li+ ion-conducting solid) by adding water in an amount less than or equal to the water solvation limit of the glass/amorphous solid. A glass-forming oxide, sulfide, or hydroxide may also be added and the resulting material may be heated to expel volatile constituents. The crystalline, electronic insulator or its constituent precursors may include a material with the general formula $A_{3-x}H_xOX$, wherein $0 \le x \le 1$, A is the at least one alkali metal, and X is the at least one halide. It may also include a glass-forming additive including at least one, or at least two, of an oxide, a hydroxide, and a sulfide. The glass-forming additive may include at least one, or at least two, of $Ba(OH)_2$, $Sr(OH)_2$, $Ca(OH)_2$, $Mg(OH)_2$, $Al(OH)_3$, or BaO, SrO, CaO, MgO, Al, $B_2O_3$, $Al_2O_3$, $SiO_2$, S and $Li_2S$. The dried, water-solvated glass/amorphous solid may include less than 2 mole percent of the glass-forming additive. The glass-forming additive may adjust the glass transition temperature Tg of the water-solvated glass/amorphous solid. The halide may comprise chlorine (Cl), bromine (Br), or iodine (I), or combinations thereof. At least a portion of the halide may exit the water-solvated glass/amorphous solid as a hydrogen halide gas. The hydroxide may react to form $H_2O$ that exits the water-solvated glass/amorphous solid as gaseous $H_2O$.

The H+-conductive water-solvated electrolyte may be formed by transforming a crystalline material including at least one alkali or alkaline-earth cation bonded to at least one acidic polyanion into a glass/amorphous solid by adding water in an amount less than or equal to the solvation limit in the crystalline material such that water dissociates into hydroxide (OH—) anions that coordinate to the cations to form polyanions, while the water may also dissociate into protons (H+) that are mobile in a framework of an acidic oxide and the polyanions. The acidic polyanion may include $(SO_4)^{2-}$ or $(PO_4)^{3-}$ or both.

The H+-conductive water-solvated glass/amorphous solid may also be formed by transforming a crystalline electronic insulator including at least one acidic polyanion and at least one cation into a water-solvated glass/amorphous proton (H+)-conducting solid by adding water in an amount less than or equal to the water solvation limit of the crystalline electronic insulator. The cation(s) may be stabilized in the form of a stable hydroxide polyanion(s). The acidic polyanion may include a phosphate (PO4)3- polyanion or a sulfate (SO4)2- polyanion or (SiO4)4- polyanion or combinations thereof. The cation may include a barium (Ba2+) ion, a potassium (K+) ion, a rubidium (Rb+) ion, or a cesium (Cs+) ion or combinations thereof. The stable hydroxide polyanion may include (Ba(OH)x)2-x ,(K(OH)x)1-x, (Rb(OH)x)1-x or (Cs(OH)x)1-x or combinations thereof.

Cathode 20 includes cathode current collector 70. Cathode 20 may also include catalytic redox-center-relay 60 in electronic contact with cathode current collector 70. Catalytic redox-center-relay 60 may be a coating or a layer covering cathode current collector 70. Catalytic redox-center-relay 60 may cause the working ion to plate onto cathode current collector 70. Catalytic redox-center-relay 60 may include an element, such a sulfur (S), a molecule, such as ferrocene (Fe(C☐H☐)☐), or a variable compound, such as lithium iron phosphate (LixFePO4, where 0≤x≤1).

Cathode 20 may further include a surface conductive film (not shown), such as carbon, on the current collector.

Suitable materials for use in cathode 20, anode 30, and electrolyte 40 may be selected based upon electrical and chemical energy characteristics of the battery and of the materials. Overall, the characteristics of the materials in combination are such that the working ion is enabled to plate onto cathode current collector 70, or a conductive film covering the surface of cathode current collector 70, if present. Catalytic-center-relay 60, which may be a certain molecule(s), a film, or an added particle, may further facilitate metal plating, when present.

On discharge, a battery delivers a current Idis at a voltage Vdis to provide electric power Pdis (Pdis=IdisVdis) for the time Δtdis it takes to complete the chemical reaction between the two electrodes. The cell density of chemical energy that is delivered as electric power Pdis at a constant current Idis=dq/dt (q=state of charge) is given by:

$$\Delta E_{dis} = \int_0^{\Delta t} P_{dis} dt = \int_0^{Q(I_{dis})} V(q)_{dis} dq = <V(q)_{dis}> Q(I_{dis}) \quad (1)$$

$$Q(I_{dis}) = \int_0^{Q(I_{dis})} dq \text{ per unit weight or volume} \quad (2)$$

$$V(q)_{dis} = V_{oc} - \eta_{dis}(I) \quad (3)$$

where $Q(I_{dis})$ is the cell capacity. The open-circuit voltage $V_{oc}$ is given by:

$$V_{oc} = (\mu_A - \mu_C)/e \quad (4)$$

is the difference between the electrochemical potentials $\mu_A$ and $\mu_C$ at the anode and cathode divided by the magnitude e of the electron charge e. The ohmic loss $\eta_{dis}(I)$ inside the cell is given by:

$$\eta_{dis}(I) = I_{dis} R_{b,dis} \quad (5)$$

where $R_{b,dis}$ is the total internal resistance to the transfer of the ionic component of the cell chemical reaction inside the cell on discharge. The cation transferred by the electrolytes is the working ion of the cell, and $R_b = R_{ct} + R_i$ contains the resistance to charge transfer of the working cation (or its precursor) across the electrode/electrolyte interfaces, $R_{ct}$, and the resistance to the mobility of the working cation in the electrolyte, $R_i$.

The chemical reaction of a primary battery cell is not reversible, that of a secondary battery cell is reversible on the application of a charging power $P_{ch} = I_{ch} V_{ch}$ where $$V_{ch} = V_{oc} + \eta_{ch}(I) \quad (6)$$

and $\eta_{ch} = I_{ch} R_{b,ch}$.

The efficiency of electric-energy storage in a secondary (rechargeable) battery cell is $P_{dis}/P_{ch}$. Irreversible chemical reactions at one or both electrodes of a secondary battery introduce a loss of the cell capacity Q(I) on successive charge/discharge cycle numbers (n+1) and n. The Coulomb efficiency $Q(I)_{n+1}/Q(I)_n$ determines the cycle life of a secondary battery cell before $\Delta E_{dis}$ is reduced to 80% of its initial value.

Since the ionic conductivity inside a battery is orders of magnitude smaller than the electronic conductivity in the external circuit, a battery cell is generally fabricated as an anode/thin electrolyte/cathode cell with a large surface area of electrode-electrolyte contacts in which each electrode also contacts a metallic current collector for delivering electrons from an electrode to the external circuit or to an electrode from the external circuit. Both electrodes of a cell change volume during charge and discharge, and retention of strong interfaces between an electrode and the current collector on one side and the electrode and the electrolyte on the other side is associated with maintaining the chemical reaction. The volume constraint may limit an electrode volumetric capacity Q(I), a figure of merit for a battery powering an electric road vehicle, where the electrode consists of small particles into which the working ion is inserted or alloyed reversibly or undergoes a conversion reaction.

The electrolyte of a battery cell may be a liquid, a polymer, a glass, a ceramic, or a composite combination thereof. Construction of a mechanically robust, flexible electrolyte that retains good interfaces with electrodes or other electrolytes over thousands of charge/discharge cycles is desired. The construction may be more of a challenge with a glass or ceramic solid electrolyte contacting a solid electrode than with polymer or liquid electrolytes. The composites of glass or ceramic electrolytes can be made with flexible polymers, resulting in a robust and flexible composite. Where the electrode is a metal that is plated and stripped or where the electrode is a metal current collector, a solid-solid contact may be stable over many charge/discharge cycles since plating can involve a strong interfacial bond and changes only the dimension perpendicular to the interface. Where the electrode is a solid particle that either alloys with, is converted by, or is inserted by the working ion, the volume changes may be three-dimensional and the solid particles may be preferentially liquid or polymer electrolyte. Where a relay or an electrode is a soluble redox molecule, the redox molecule may contact the cathode current collector in the solvent used.

Traditional batteries may use an aqueous electrolyte that conducts H+ ions, and the energy gap between the hydrogen-evolution reactions and the oxygen evolution reaction of water is 1.23 eV, which may limit a stable shelf life of an aqueous-electrolyte to a discharge voltage V(q)≤1.5 V.

An organic-liquid electrolyte conducting Li+, Na+, or K+ ions can have a stable discharge voltage V(q)≤3.0 V with a long cycle life. Organic-liquid-electrolyte batteries with a higher V(q) require formation of a passivating solid-electrolyte interphase (SEI) layer on the surface of one or both electrodes of a secondary battery cell to passivate the electrode-electrolyte reaction where μA>LUMO and/or μC<HOMO. The LUMO and HOMO of the electrolytes are, respectively, the lowest unoccupied and highest occupied molecular orbitals of the electrolyte. The energy gap Eg=LUMO−HOMO is referred to as the energy window of the electrolyte.

Figure 2:
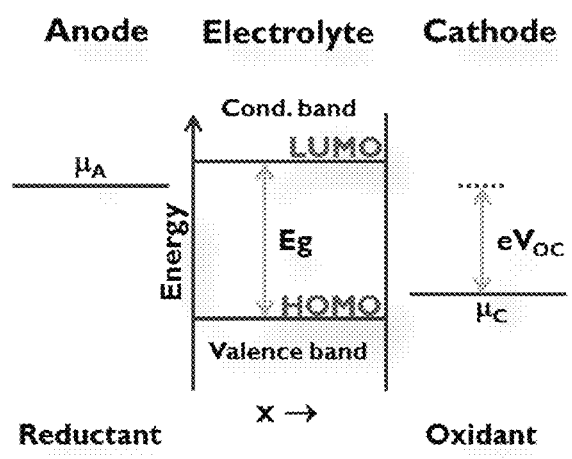
FIG. 2 is a schematic of the energy profile of a stable battery with an electrolyte energy window having an energy gap Eg=LUMO−HOMO, or lowest unoccupied molecular orbital (LUMO)—highest occupied molecular orbital (HOMO).

FIG. 2 shows a schematic of the energy profile of a stable battery with an electrolyte energy window having an energy gap Eg=LUMO−HOMO. The Fermi energy of the anode is $\mu A$<LUMO and the Fermi energy of the cathode is $\mu C$>HOMO. A Fermi energy $\mu A$>LUMO would reduce the electrolyte and a Fermi energy $\mu C$<HOMO would oxidize the cathode, unless a passivating SEI layer is provided at the electrode surface.

As is illustrated in FIG. 2, an anode with a $\mu A$>LUMO may reduce the electrolyte and a cathode with a $\mu C$<HOMO may oxidize the electrolyte. However, a solid electrolyte (polymer, glass, ceramic, or combination of these) can have a large Eg with a LUMO at a higher energy than the $\mu A$ of an alkali-metal anode and a HOMO at a lower energy than a high-voltage cathode $\mu C$ to provide a high-voltage, safe battery cell without any passivating SEI at an electrode-electrolyte interface.

However, the conventional all-solid-state batteries with an alkali-metal anode have limited capacities, rates of charge/discharge, and cycle life because electrode-electrolyte interfaces are difficult to achieve with a ceramic electrolyte. The interfaces on the cathode side may be particularly difficult to achieve, where the cathode consists of small particles to mitigate poor electronic conductivity and a large volume change during cycling. The conductivities of the working ion in ceramic solid electrolytes may be so low that extremely thin electrolytes have been used. Polymer solid electrolytes may have too low working-ion conductivity at room temperature to give an all-solid-state battery cell that is competitive with a cell having an organic-liquid electrolyte for large-scale battery applications.

The present disclosure provides safe battery cells comprising a solid electrolyte contacting an alkali-metal anode or a metallic anode current collector that can be plated by an alkali metal. The solid electrolyte is wet by the alkali metal and has a LUMO>$\mu A$. The alkali metal may either be plated on a cathode current collector with Fermi energy $\mu cc$<$\mu A$ or on a surface conductive film, such as carbon, on the current collector having an electrochemical potential $\mu f$ with $\mu cc$<$\mu f$<$\mu A$. Optionally a catalytic relay having a redox $\mu ox$, when $\mu cc$<$\mu ox$<$\mu f$ may be used. The catalytic relay (molecule, film, particle) may make electronic contact with the current collector and may reduce the working ion at the cell before relaying the working ion to the current collector (with/without the surface film) for plating as a cathode at a discharge voltage. The catalytic relay may be used whether or not a surface film is present at the current collector.

$$V_{dis} \lesssim (\mu_A - \mu_{ox})/e \qquad (7)$$

e is the magnitude of the electron charge.

Alkali-metal anodes can be plated or stripped reversibly without dendrite formation with a liquid, polymer, ceramic, or glass/amorphous electrolyte having a surface that is wet by the alkali metal. The glass/amorphous Li+ or Na+ solid electrolyte (Li-glass or Na-glass) may have a working-cation conductivity comparable to that of an organic-liquid-electrolyte. The glass/amorphous solid electrolyte may be wet by an alkali-metal anode, and may contains a high concentration of electric dipoles that can be oriented parallel to one another to provide a large dielectric constant. The Li-glass and Na-glass electrolytes have been reduced to practice for the four embodiments of this disclosure described with respect to FIGS. 3-8.

Plating of an alkali metal onto a metallic current collector that is not wet by the alkali metal may be dendrite-free if the working cations are reduced before reaching the current collector. If the catalytic redox-center relay for the cathode plating has a redox energy $\mu ox$>$\mu cc$, where $\mu cc$ is the electrochemical potential (Fermi energy) of the metallic current collector, the electrons from the anode during battery discharge, or from the current collector during the supercapacitor discharge, may go to the working cations via the redox relay center. The open-circuit voltage that can be realized by the plating-battery/supercapacitor cell is given by:

$$V_{oc} = (\mu_A - \mu_{ox})/e \qquad (8)$$

If a redox-relay is needed to plate the alkali metal on the current collector, the open-circuit voltage is given by:

$$V_{oc} = (\mu_A - \mu_{cc})/e \qquad (9)$$

If the redox-center relay is not needed; e is the magnitude of the electron charge. Therefore, to optimize the cell open-circuit voltage $V_{oc}$, a metallic current collector may be selected with a low-energy $\mu_{cc}$ such as copper (Cu), nickel (Ni), zinc (Zn), silver (Ag), gold (Au), or, alternatively, a metallic compound such as a transition-metal oxide or sulfide.

The metal plating-battery/supercapacitor cell disclosed herein can provide a safe high-voltage battery cell with a high capacity of electrical-energy storage as chemical energy and a sufficient capacity of an extremely high-rate electrostatic energy storage having a long cycle life and a storage efficiency approaching 100%. The disclosed metal plating-battery/supercapacitor cell is an all-solid-state plating-battery/supercapacitor cell with a Li-glass or Na-glass electrolyte. The metal plating-battery/supercapacitor cell disclosed herein can provide a battery cell without dendrite formation on a metallic current collector with the aid of a catalytic redox-center-relay that makes electronic contact with the current collector. The metal plating-battery/supercapacitor cell disclosed herein can provide a novel plating-battery cell that stores electric power as chemical energy in an alkali-metal anode that is discharged by plating the anode metal onto a cathode current collector of lower electrochemical potential (Fermi energy) than that of the anode, optionally using a catalytic redox center that reduces the working cation of the cell and relays the working cation to the cathode current collector for plating to provide a primary battery cell, and the alkali metal can be returned to the anode on charge to provide a secondary battery cell. The metal plating-battery/supercapacitor cell disclosed herein can provide a metal plating-battery/supercapacitor cell that combines storing electricity as chemical energy as in a metal plating battery and storing electric power as electrostatic energy as in a supercapacitor The metal plating-battery/supercapacitor cell disclosed herein can provide a cell comprising anode and cathode current collectors of different Fermi energy in which the electric power stored is primarily electrostatic energy but is also stored by plating the working cation of the electrolyte as a metal on the anode current collector. With load resistance $R_L$ on discharge and an internal battery resistance $R_{b,dis}$, the amount of plated anode may remain fixed to give a continuous discharge current $I_{dis}$ through the load if the energy $I_{dis}(R_L + R_{b,dis})$ is supplied by external heat applied to the cell. A battery with cells in parallel may have a small enough $I_{dis}$ to give a sustained work output $I_{dis}R_L$ at a modest temperature.

The metal plating-battery/supercapacitor cell disclosed herein may be a plating-battery/supercapacitor cell that uses a solid electrolyte with an ionic conductivity comparable to that of an organic-liquid electrolyte and a large dielectric constant associated with electric dipoles that can be oriented parallel to one another, optionally with a liquid or polymer contacting one or both electrodes. The metal plating-battery/supercapacitor cell disclosed herein may enable storage of electric energy in a secondary plating-battery/supercapacitor cell, a high-capacity, primary plating-battery/supercapacitor cell, or a metal plating battery in which the cations of the metal plated on the anode current collector are supplied by the electrolyte.

In the metal plating-battery/supercapacitor cell disclosed herein, the discharge and charging currents of the cells may be increased by heat, which decreases the ionic resistivity Ri of the electrolyte and the charge-transfer resistance across electrode-electrolyte and any electrolyte-electrolyte interfaces, when present.

In the metal plating-battery/supercapacitor cell disclosed herein, plating of an alkali metal on a current collector is provided where the current collector is copper at the cathode of a plating battery cell, FIGS. 3-6.

Figure 3:
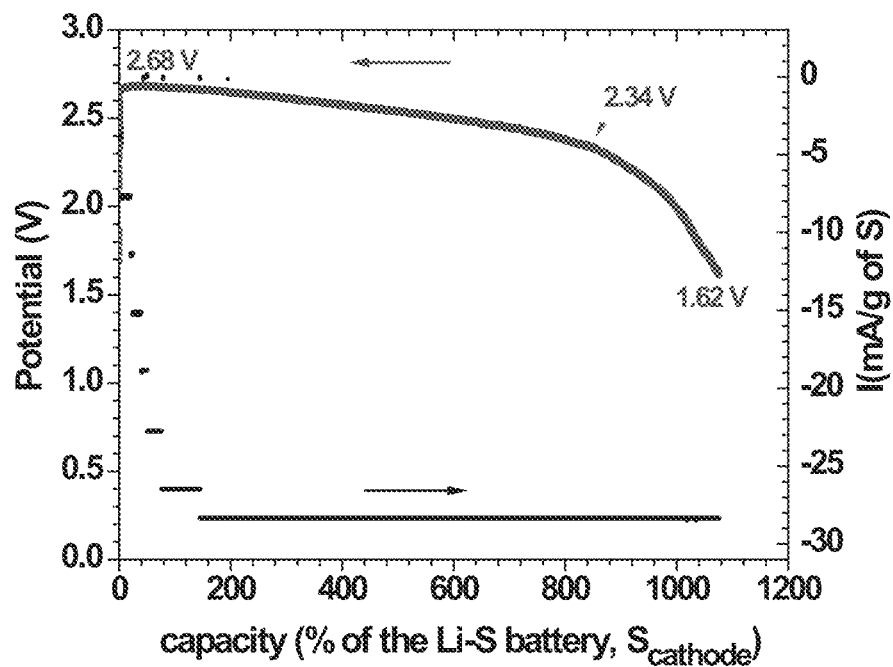
FIG. 3 is a plot of discharge voltage versus the capacity of a Li/S cell in the form of a Li/Li-glass/Cu cell containing a sulfur (S) relay.

FIG. 3 shows a plot of discharge voltage versus the capacity of a Li/S cell in the form of a Li/Li-glass/Cu cell containing a sulfur (S) relay. In FIG. 3, the capacity is shown relative to the capacity to reduce all the S to Li2S to show that the capacity of a cell acting as a primary cell is the capacity to plate the anode lithium onto the cathode rather than to reduce the S relay to Li2S.

Figure 4:
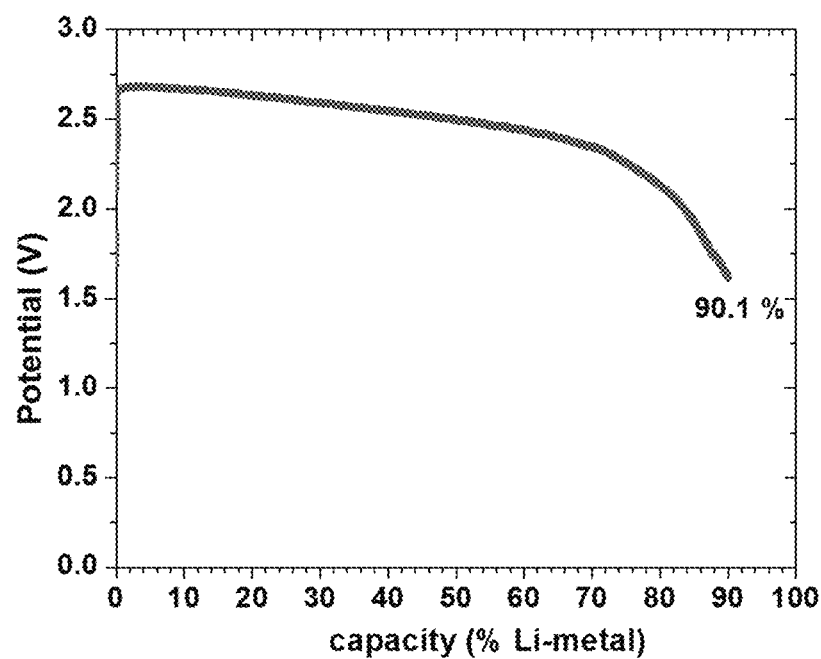
FIG. 4 is a plot of discharge voltage versus the capacity of the Li/S cell of FIG. 3 relative to the capacity of the lithium anode.

FIG. 4 shows a plot of discharge voltage versus the capacity of the Li/S cell of FIG. 3 relative to the capacity of the lithium anode to show a plating of up to 90% of the lithium of the anode on the cathode current collector with the aid of the sulfur relay.

Figure 5:
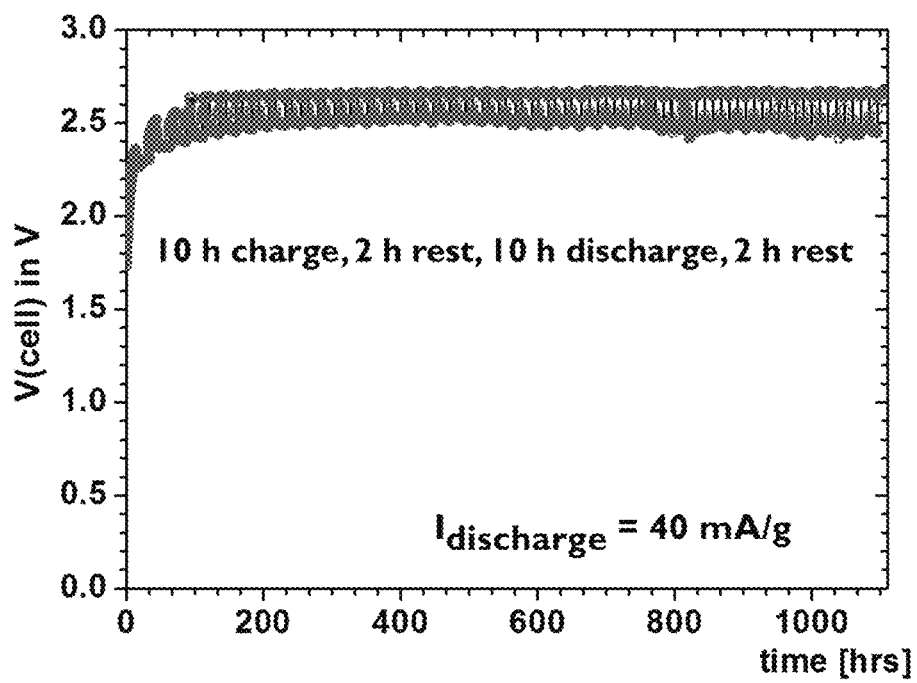
FIG. 5 is a plot of storage efficiency and coulombic efficiency of electric-power storage in the Li/S cell of FIG. 3 with a discharge/charge cycle of 10 h charge, 2 h rest, 10 h discharge, 2 h rest for a large number of cycles.

FIG. 5 shows a plot of storage efficiency and coulombic efficiency of electric-power storage in the Li/S cell of FIG. 3 with a discharge/charge cycle of 10 h charge, 2 h rest, 10 h discharge, 2 h rest for a large number of cycles. It is noted that the data collection in FIG. 5 is ongoing after 1000 hours.

Figure 6:
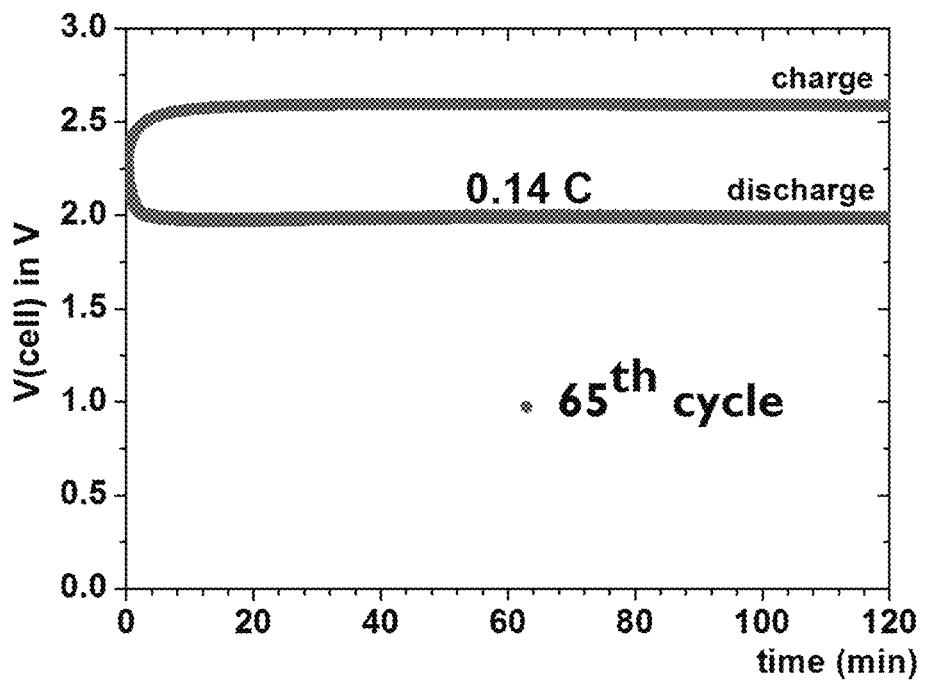
FIG. 6 is a plot of storage efficiency and coulombic efficiency of electric-power storage in a Na/Na-glass/Cu cell with a ferrocene molecule as the redox center for plating sodium on a copper current collector.

FIG. 6 shows a plot of storage efficiency and coulombic efficiency of electric-power storage in a Na/Na-glass/Cu cell with a ferrocene molecule as the redox center for plating sodium on a copper current collector.

Figure 7:
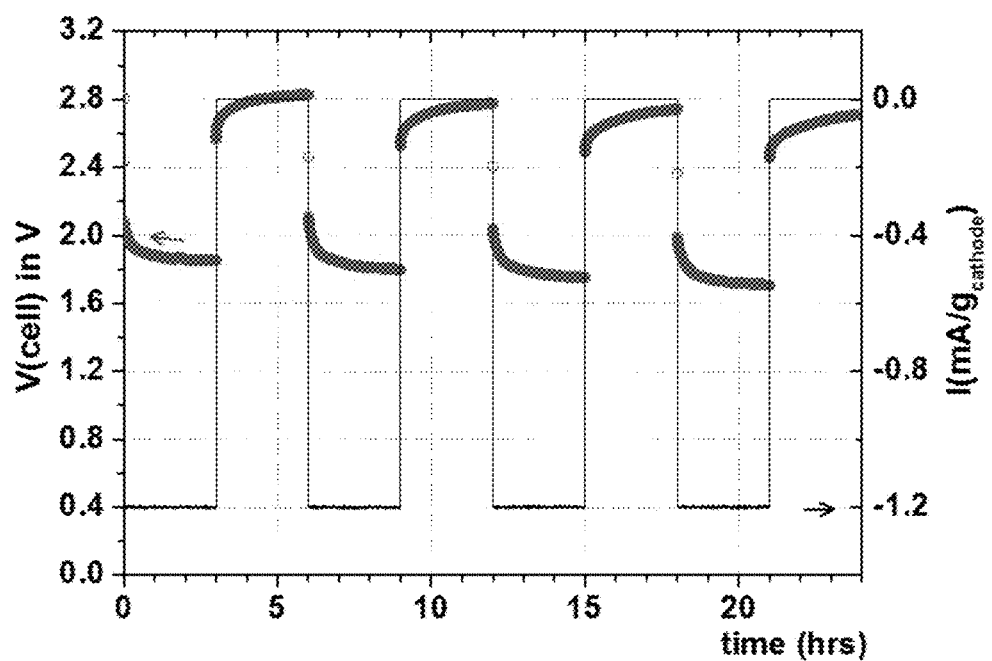
FIG. 7 is a plot of charge/discharge voltage profiles versus time of a Li/S cell, in which the cell is self-charged.

FIG. 7 shows a plot of charge/discharge voltage profiles versus time of a Li/S cell, in which the cell is self-charged, during which some Li+ from the electrolyte is plated on the anode. In the Li/S cell, the plating of Li+ on the anode reduces the capacity of the electrostatic energy stored and therefore the voltage with each successive cycle. The data point on the voltage plot from self-charge to discharge indicate a fast initial voltage change (where no data point could be acquired) followed by a measurable rate of voltage change.

Figure 8:
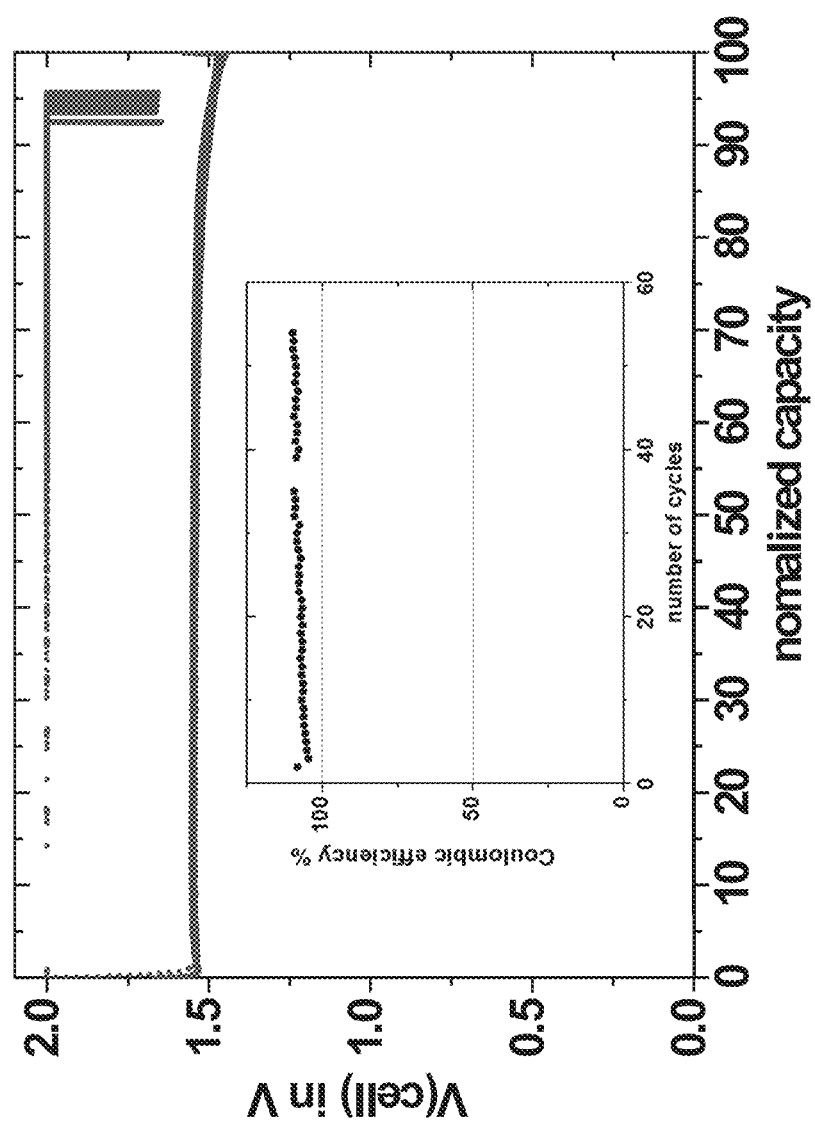
FIG. 8 is a charge/discharge voltage plot of an Al/Li-glass/Cu cell showing, inset, an increase to over 100% in the coulomb efficiency of electric-power storage on successive self-charges at open-circuit owing to plating of metallic lithium on the aluminum anode.

FIG. 8 shows a charge/discharge voltage plot of an Al/Li-glass/Cu cell showing, inset, an increase to over 100% in the coulomb efficiency of electric-power storage on successive self-charges at open-circuit owing to plating of metallic lithium on the aluminum anode.

In the metal plating-battery/supercapacitor cell disclosed herein, a primary plating-battery cell having a lithium anode, a glass/amorphous electrolyte, a copper current collector and an elemental-sulfur redox center relay contacting the current collector with carbon is provided, FIGS. 3, 5, 7, and 8.

In the metal plating-battery/supercapacitor cell disclosed herein, a secondary plating-battery/supercapacitor is provided with a sodium anode, a ferrocene redox-center relay and a copper current collector, FIG. 6, and a Li-glass cell with an aluminum anode current collector and a copper cathode current collector is disclosed without the addition in fabrication of lithium to the aluminum current collector, FIG. 8.

The present disclosure provides a method of plating an alkali metal without dendrites on a metal current collector that is normally not wet by the alkali-metal with the aid of a redox material contacting the current collector that may reduce the alkali-metal cation before the alkali-metal cation is plated on the redox material or relayed to the current collector.

The present disclosure also includes a metal plating-battery cell, either primary or secondary, that uses an alkali-metal anode that may be plated dendrite-free on the alkali-metal from the electrolyte and may be plated on a cathode current collector having a Fermi energy at a lower energy than that of the anode with the aid of a redox intermediary material. In any of the disclosed embodiments of the metal plating-battery cell, plating on the cathode current collector may be performed without the aid of a redox material intermediary. The metal plating-battery cell may use sulfur as the redox intermediary. The metal plating-battery cell may use ferrocene as the redox intermediary. The metal plating-battery cell may use silicon as the redox intermediary. The metal plating-battery cell may use sulfide as the redox intermediary. The metal plating-battery cell may use an oxide as the redox intermediary. The metal plating-battery cell may use a solid-glass electrolyte and combines chemical and electrostatic storage of electric power. The metal plating-battery cell may use a metallic compound as the cathode current collector. The metal plating-battery cell may use carbon on a current collector to aid plating of an electrode on the current collector. The metal plating-battery cell may use a gold film on the cathode-collector surface. The metal plating-battery cell may use an oxide film on the cathode current collector. The metal plating-battery cell may be used in a plating-battery/supercapacitor secondary battery cell. The metal plating-battery cell may be used in a plating-battery or plating-battery/supercapacitor cell.

The present disclosure also includes an electrochemical containing an anode current collector of a higher Fermi energy than that of the cathode current collector and a solid Li+ or Na+ glass/amorphous electrolyte with a high dielectric constant that, on charge, stores electric power as electrostatic energy and as chemical energy by plating some of the electrolyte working ions on the anode. At open-circuit voltage, plating of the working ions on the anode may proceed by self-charge to increase the capacity of the cell discharge. The electrochemical cell may have an aluminum anode and a copper cathode. In the electrochemical cell, the metal of the working ion may be added to the anode current collector. In the electrochemical cell, the cathode current collector may be copper (Cu), zinc (Zn), silver (Ag), gold (Au), silicon, a sulfide, or an oxide. In the electrochemical cell, an electronically conducting material of large surface area may be the current collector to increase the electrode-electrolyte contact area for storing electrostatic charge. The electrochemical cell may have a load in an external circuit of small resistance RL such as an LED or an electronic device and also a small internal battery resistance Rb,dis such that the Idis(RL+Rb,dis) loss is less than the energy supplied externally by heat, thereby creating a continuous Idis.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A method of operating an electrochemical storage cell comprising a battery comprising:
   an alkali metal anode having an anode Fermi energy;
   an electronically insulating, amorphous, dried solid electrolyte able to conduct alkali metal, having the general formula $A_{3-x}H_xOX$, wherein $0 \leq x \leq 1$, A is the alkali metal, and X is at least one halide; and
   a cathode comprising a cathode current collector having a cathode Fermi energy lower than the anode Fermi energy; and
   a catalytic redox-center-relay material,
   the method comprising:
   plating the alkali metal dendrite-free from the solid electrolyte onto the alkali metal anode and,
   plating the alkali metal on the cathode current collector with the aid of the catalytic redox-center-relay material.

2. The method of claim 1, wherein the alkali metal is lithium (Li).

3. The method of claim 1, wherein the alkali metal is sodium (Na).

4. The method of claim 1, wherein the solid electrolyte further comprises a glass-forming additive comprising at least one of $Ba(OH)_2$, $Sr(OH)_2$, $Ca(OH)_2$, $Mg(OH)_2$, $Al(OH)_3$, BaO, SrO, CaO, MgO, Al, $B_2O_3$, $Al_2O_3$, $SiO_2$, S, and $Li_2S$.

5. The method of claim 1, wherein the solid electrolyte further comprises less than 2 mole percent of a glass-forming additive.

6. The method of claim 1, comprising storing power in the battery both chemically and electrostatically due to the solid electrolyte.

7. The method of claim 1, wherein the cathode current collector comprises a copper (Cu), silver (Ag), zinc (Zn), or gold (Au) metal, or an alloy thereof.

8. The method of claim 1, wherein the catalytic redox-center-relay material comprises sulfur.

9. The method of claim 1, wherein the catalytic redox-center-relay material comprises ferrocene.

10. The method of claim 1, wherein the catalytic redox-center-relay material comprises silicon.

11. The method of claim 1, wherein the catalytic redox-center-relay material comprises a sulfide.

12. The method of claim 1, wherein the catalytic redox-center-relay material comprises an oxide.

* * * * *